United States Patent
Klingenbeck et al.

(10) Patent No.: US 8,885,908 B2
(45) Date of Patent: Nov. 11, 2014

(54) METHOD FOR ACQUIRING A 3D IMAGE DATASET FOR AN IMAGE OBJECT

(75) Inventors: Klaus Klingenbeck, Aufseβ (DE); Ernst-Peter Rührnschopf, Erlangen (DE); Bernhard Scholz, Heroldsbach (DE)

(73) Assignee: Siemens Aktiengesellschaft, Munich (DE)

( * ) Notice: Subject to any disclaimer, the term of this patent is extended or adjusted under 35 U.S.C. 154(b) by 233 days.

(21) Appl. No.: 13/527,843

(22) Filed: Jun. 20, 2012

(65) Prior Publication Data

US 2013/0004051 A1 Jan. 3, 2013

(30) Foreign Application Priority Data

Jun. 30, 2011 (DE) .................. 10 2011 078 462

(51) Int. Cl.
*G06K 9/00* (2006.01)
*G06T 11/00* (2006.01)

(52) U.S. Cl.
CPC .......... *G06T 11/006* (2013.01); *G06T 2211/416* (2013.01); *G06T 2211/424* (2013.01)
USPC ....................................... 382/132

(58) Field of Classification Search
CPC ............ G06T 11/005; G06T 2211/421; G06T 2211/424; G06T 2211/416
USPC ................................. 382/132, 154
See application file for complete search history.

(56) References Cited

FOREIGN PATENT DOCUMENTS

DE    102009015032 A1    10/2010

OTHER PUBLICATIONS

Zellerhoff et al.; "Low contrast 3D reconstruction from C-arm data", Proceedings of the SPIE, Medical Imaging 2005, vol. 5745, pp. 646-655; Magazine; 2005.
Yiannis Kyriakou, Thomas Riedel and Willi A. Kalender, "Combining deterministic and Monte Carlo calculations for fast estimation of scatter intensities in CT", Phys. Med. Biol. 51 (2006), pp. 4567-4586; ICMP 2005; Others; 2005.
Censor et al.; A method of iterative data refinement and its applications; Mathematical Methods in the Applied Sciences 7: pp. 108-123, (1985); Others; 1985.
Weiguang Yaoa et al. An analytical approach to estimating the first order X-ray scatter in heterogeneous medium Med Phys (2009), vol. 36, 3145-3156; Magazine; 2009.
Weiguang Yaoa et al. An analytical approach to estimating the first order X-ray scatter in heterogeneous medium. II. A practical application Med Phys (2009), vol. 36, 3157-3167; Magazine; 2009.
Ernesto Mainegra-Hing et al., "Variance reduction techniques for fast Monte Carlo CBCT scatter correction calculations", Phys. Med. Biol. 55 (2010) pp. 4495-4507; Magazine; 2010.
A General Framework and Review of Scatter Correction Methods in X-Ray Volume Computerized Tomography. Part 1: Scatter Compensation Approaches, submitted to Medical Physics, Oct. 27, 2010; Others; 2010.
G. Jerry et al.: "Characterization of scattered radiation in kV CBCT images using Monte Carlo simulations", Med. Phys. vol. 33 (11), Nov. 2006, p. 4320-4329; Others; 2006.

*Primary Examiner* — Utpal Shah

(57) ABSTRACT

A method for acquiring a 3D image dataset for an image object based on a plurality of 2D image datasets relating to the image object is proposed. A scattered radiation is taken into account in an acquisition operator used in the method for the optimum reconstruction of the 3D image dataset. The acquisition operator should be as close as possible to the real mapping operator.

8 Claims, 1 Drawing Sheet

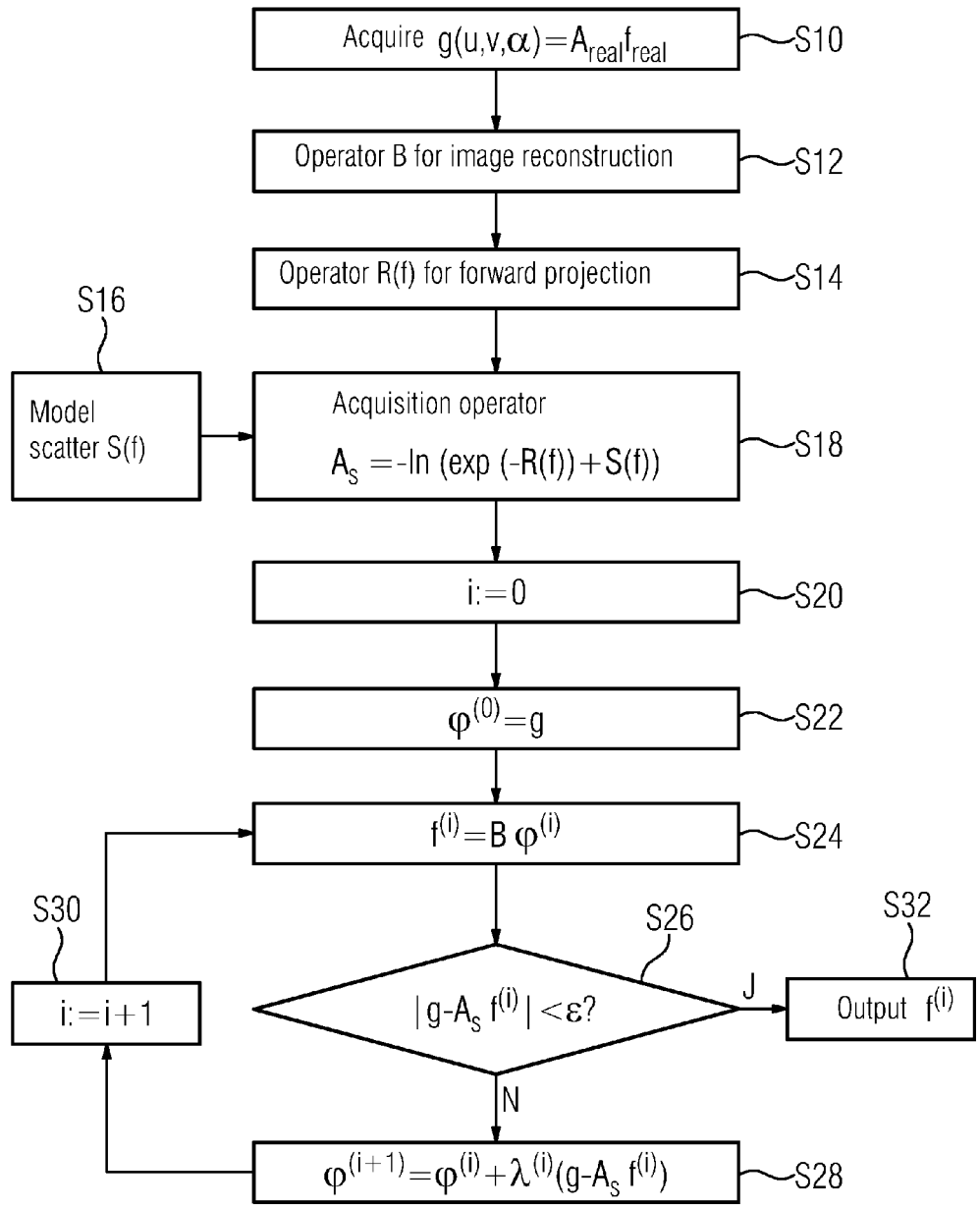

METHOD FOR ACQUIRING A 3D IMAGE DATASET FOR AN IMAGE OBJECT

CROSS REFERENCE TO RELATED APPLICATIONS

This application claims priority of German application No. 10 2011 078 462.4 filed Jun. 30, 2011, which is incorporated by reference herein in its entirety.

FIELD OF INVENTION

The application relates to a method for acquiring a 3D image dataset for an image object.

BACKGROUND OF INVENTION

A method for acquiring a 3D image dataset for an image object. results from a generalization of an article by Y. Censor, T. Elfving, G. T. Herman: "A Method of Iterative Data Refinement and its Applications", Math. Meth. Appl. Sci. 7 (1985), pages 108-123.

The application deals in particular with x-ray imaging. In each instance a 2D image dataset is acquired with the aid of an x-ray radiation source and an x-ray radiation detector. These are moved into different positions, with a coupled movement of the x-ray radiation source and the x-ray radiation detector taking place. Such a 2D image dataset is acquired in each position, in that the x-ray radiation source emits x-ray radiation, the x-ray radiation is attenuated by the image object, being attenuated to different degrees by different regions of the image object, with the degree of attenuation by the respective regions of the image object showing up as gray scale values, which are acquired with the aid of the x-ray radiation detector. These 2D image datasets can also be referred to as "projection images". If a sufficiently large number of projection images are acquired in suitable positions, a mathematical method can be used to reconstruct a 3D image dataset. A 3D image dataset indicates for volume elements in the space taken up by the image object the degree to which the image object attenuates the x-ray radiation in the region of the volume element. Gray scale values are thus assigned to 3D volume elements.

The problem regularly arises of configuring the so-called back projection, in other words the mapping of the 2D image datasets onto the 3D image dataset, as optimally as possible so that the 3D image dataset reproduces the actual properties of the image object as far as possible. The mathematical method can be reproduced by an operator B for the 3D reconstruction. In the simplest instance said operator can simply be applied to data from the 2D image datasets. The 2D image datasets are described appropriately as vector g here.

However properties are also now known of the mapping of the three-dimensional space, in which the image object is located, onto the respective plane of the x-ray radiation detector, which is typically a flat screen x-ray detector. It is thus possible to a certain extent, by applying an operator A describing a projection image acquisition, to verify whether the original vector g of the 2D image datasets (the projection images) ultimately results again. According to the article by Y. Censor et al. cited in the introduction, the result of the application of the operator A describing the projection image acquisition to the result of the application of the operator B to the vector g, ABg, can also be part of a correction of the data values acquired for the 3D image dataset. In this process an auxiliary dataset is defined (appropriately in the form of a vector) and, typically after initialization of the auxiliary dataset, in each iteration the operator B for the 3D reconstruction is applied to the auxiliary dataset and the auxiliary dataset is then corrected based on an operator A applied to said provisional 3D image dataset acquired in this manner and describing the image acquisition and based on the 2D image datasets. If we refer to the auxiliary dataset as $\phi$ and set the provisional result for the 3D image dataset to $f^{(i)}=B\phi^{(i)}$, it is proposed that $\phi^{(i+1)}$ be calculated using $$\phi^{(i+1)}=\phi^{(i)}+\lambda^{(i)}(g-Af^{(i)}), \quad (1)$$

where $\lambda^{(i)}$ is a factor that can be the same for every iteration or can be different for different iterations. If the correct reconstruction operator $B=A^{-1}$ is now found exactly, no iteration would be required. However the 3D reconstruction typically includes simplifying assumptions and brings about artifacts resulting from such assumptions, so that with appropriate selection of the prefactors $\lambda(i)$ an initially gradual convergence takes place in the method, so that at some point $(g-A f^{(i)})$ becomes smaller than $\epsilon$, where $\epsilon$ is a suitable limit value.

During imaging with x-ray radiation there is inevitably scattered radiation. Scattered radiation is radiation which does not penetrate the image object in a straight line.

For example it is known from the article by M. Zellerhoff, B. Scholz, E.-P. Rührnschopf, B. Brunner: "Low contrast 3D reconstruction from C-arm data", Proceedings of SPIE Conference 2005, Vol. 5745, pages 646-655, to take into account and correct the scattered radiation for a 3D reconstruction.

SUMMARY OF INVENTION

The object of the present application is to specify a reconstruction method, in other words a method for acquiring a 3D image dataset for an image object, which takes better account of scattered radiation than before.

The object is achieved in that a scattered radiation is taken into account during the method when determining the operator A describing the image acquisition in equation (1).

The inventors of the idea claimed here recognize that the method in equation (1) can be extended so that scattered radiation can also be taken into account; in particular the operator A describing the acquisition of the projection images is the primary starting point here for including scattered radiation. This does not exclude the operator B also already including a simple scattered radiation correction for the 3D reconstruction to refine the method or to accelerate the iteration.

The operator $A_S=A$ describing the projection image acquisition can be written in mathematical form as $$A_S=-\ln[\exp(-R(f))+S(f)], \quad (2)$$

where $R(f)$ is the operator for describing forward projection from the three-dimensional space, in which the 3D image dataset is defined, to 2D planes, which are defined in the respective positions, in which the 2D image datasets were recorded, i.e. to those 2D planes on which the 2D projection images are based. The variable $S(f)$ in the present instance is different from zero: specifically it represents the scattered radiation in this embodiment. This function $S(f)$ therefore symbolizes a computation method, which can be used to calculate the (normalized) intensity distribution of the scattered radiation on the detector from a digital 3D image. In the present instance "normalized" means that the scattered radiation intensity is divided by the unattenuated primary radiation intensity $I_0$. (The expression $\exp(-R(f))$ corresponds in the same manner to normalized primary intensity, i.e. intensity without scattered radiation).

Instead of an analytical method $S(f)$, an analytical (deterministic) calculation of simple scatter can also take place to implement the scattered radiation operator S, while the almost constant background underlying multiple scatter can be estimated by empirical parameters (which are essentially a function of the recording geometry and the size of the scatter object). In the same way a deterministic calculation of simple scatter can also take place, with multiple scatter then being calculated with the aid of a fast Monte Carlo program, for which relatively few Monte Carlo runs and significant smoothing are sufficient. Reference is made here for example to the article by Y. Kyriakou, T. Riedel and W. A. Kalender: "Combining deterministic and Monte Carlo simulations for fast estimation of scatter intensities in CT", Phys Med Biol (2006), vol. 51, pages 4567-4586. Alternatively the scattered radiation operator $S(f)$ can also be determined by Monte Carlo calculation alone, it being possible for certain simplifications to be made to reduce outlay. The reprojection operator $R(f)$ is defined such that the reprojection takes place on the actual fine discretization grid, so that the deviation residue of significance for the proposed iteration algorithm is not determined by any discretization or modeling errors but essentially only by scattered radiation. A polychromatic calculation can also take place but it is simpler to calculate a monochromatic projection for a constant quantum energy; in some instances beam hardening can then be calculated.

The inventive method can also be executed by inserting the operator $A_S$=A from equation (2) describing projection image acquisition into equation (1). It is also possible to use the cited iteration formula, it being possible for the prefactor $\lambda^{(i)}$ for different iterations to be different, to bring about faster convergence. There are certain abort criteria for the iteration. In addition to the criterion that the difference between data from the 2D image datasets on the one hand and data acquired by the operator applied to the provisional 3D image dataset and describing the image acquisition on the other hand should be smaller than a limit value, it can also be a criterion that the iteration is performed until the difference between the operator applied to the provisional image dataset of said iteration and describing the project image acquisition on the one hand and the operator applied to the provisional image dataset of the previous iteration and describing the projection image acquisition on the other hand should be smaller than a threshold value. In the first instance the difference is always calculated between the actual image data and the calculated data. In the other instance it is calculated whether the difference from iteration to iteration becomes sufficiently small. Both criteria can be advantageous in program-related implementations.

Alternatively or additionally the sequence of iterations can be terminated after a predetermined maximum number of iterations.

BRIEF DESCRIPTION OF THE DRAWINGS

An embodiment of the application is described in more detail below with reference to the drawing, in which the FIGURE shows a flow diagram to illustrate the method.

DETAILED DESCRIPTION OF INVENTION

The application starts by acquiring projection image data $g(u, v, \alpha)$ for an image object that can be described by a function $f_{real}(x, y, z)$, using a mapping rule $A_{real}$. Said data is to be acquired in the present instance with the aid of x-ray radiation, with the coordinates u, v being coordinates of a two-dimensional x-ray radiation detector and with α being data relating to the position of the x-ray radiation detector and the x-ray radiation source in the space. Typically α describes a vector from the site of the x-ray radiation source to the x-ray radiation detector but an angle of rotation about a rotation axis can also be given, etc. As far as g is then concerned, it should be considered in each instance to be a combination of all the possible combinations of u, v and α, specifically a combination to form a vector. Different 2D projection image datasets, which are therefore acquired with a different α, then correspond to different inputs in the vector. For the present consideration it is not relevant that said vector can have several million inputs.

The vector g should designate already normalized and logarithmized CT projection data. This requires all the standard calibration procedures and precorrections to have already been performed. It can therefore be assumed that g is essentially line integrals of the attenuation contributions of the function $f(x, y, z)$, which are however "contaminated" by scattered radiation.

In step S12 an operator B for the image reconstruction is defined. Ideally B would be equal to $A_{real}^{-1}$. In this instance, applying B to g would give $f_{real}(x, y, z)$ exactly again. However for image reconstruction from a plurality of 2D image datasets to acquire a 3D image dataset, simplifying mathematical assumptions are typically made, but not exactly $A_{real}^{-1}$. With the present method account is not taken in the operator B inter alia that scattered radiation occurs due to the fact that imaging takes place with the aid of x-ray radiation.

In step S14 an operator $R(f)$ is calculated which indicates for logarithmically normalized variables how the mapping rule appears in space in each instance for the individual positions α. If there were no scattered radiation (and no beam hardening), $R(f)$ would be equal to $A_{real}$.

In the present instance however it is assumed that there is scattered radiation. In step S16 an operator $S(f)$ is calculated for the scattered radiation. This can take place completely analytically with suitable approximations or in some instances the effect of simple radiation can be calculated analytically and the remainder can be estimated or determined by Monte Carlo calculation or ultimately the complete operator $S(f)$ can be calculated by Monte Carlo calculation. The variable $S(f)$ also includes the recording geometry, such as for example the focus-detector distance (distance between x-ray radiation source and x-ray radiation detector), the air gap between object and x-ray radiation detector, the opening angle of the radiation cone, etc. The operator $S(f)$ is also a function of the collimation, the energy spectrum of the radiation, determined by tube voltage, prefiltering, spectral responsiveness of the detector, etc. and in some instances also of a scattered beam grid when used.

Step S16 therefore incorporates all existing knowledge about recording technology and scattered radiation in the determination of the operator $S(f)$.

In step S18 the acquisition operator $A_S$ is determined in the following formula $$A_S = -\ln[\exp(-R(f)) + S(f)]. \quad (3)$$

This acquisition operator should be the most realistic approximation of the actual mapping operator $A_{real}$ possible.

The acquisition operator $A_S$ is a generalization of the radon or conebeam transformation, in so far as the exponential Lambert-Beer attenuation law and this, as non-linear operators, describe the physical measurement process primarily including scattered radiation as accurately as possible. The acquisition operator also already includes the standard logarithmization required for CT projection data.

The actual computation method now starts in step S20 by setting a counter i to zero. An auxiliary dataset, in other words a vector φ, is set equal to g in a first iteration $\phi^{(0)}$, see step S22.

The iteration now starts: in each iteration an approximation of $f_{real}$, namely $f^{(i)}$, is calculated in step S24 as $$f^{(i)}=B\phi^{(i)} \quad (4)$$

In step S26 it is now verified in a defined criterion whether sufficient convergence has been achieved. In the present instance the acquisition operator $A_S$ is applied to the provisional 3D image dataset $f^{(i)}$ and the result deducted from the vector g. It is checked whether the sum of this result is smaller than $\epsilon$. In the first iteration this is typically not the case, so the method moves to step S28. The difference calculated in step S26 here serves with a prefactor $\lambda^{(i)}$ as the basis for a change to the auxiliary dataset $\phi^{(i)}$ in the formula $$\phi^{(i+1)}=\phi^{(i)}+\lambda^{(i)}(g-A_S f^{(i)}). \quad (5)$$

In step S30 the counter is then incremented by one.

Step S24 again follows and the check from step S26. The steps S28 and S24 are performed until the check criterion in step S26 is at some point satisfied. If so, in step S32 the dataset $f^{(i)}$ is output with the respectively applicable i as an approximation of $f_{real}$.

Instead of the check criterion shown in FIG. 1, it can also be checked in step S26 whether or not two successive iterations change anything appreciably, for example it can be checked whether $|A_S f^{(i)} - A_S f^{(i-1)}| < \epsilon'$. To ensure convergence the factor $\lambda^{(i)}$ can be smaller than one or be virtually dispensed with, by setting it to one all the time. In some instances the prefactor $\lambda^{(i)}$ can also be selected as a function of i.

Instead of aligning itself ideally with $A_{real}^{-1}$, the operator B can also be selected where possible so that $B \approx A_S(-1)$, in other words to match the acquisition operator. The more closely B approximates to the inverse of $A_S$, the smaller the correction term for $\phi^{(i)}$.

The invention claimed is:

1. A method for acquiring a 3D image dataset for an image object from a plurality of 2D image datasets of the image object, comprising:
   iteratively applying an operator for reconstructing the 3D image dataset to an auxiliary dataset to acquire a provisional 3D image dataset;
   determining an operator describing an image acquisition of the 2D image datasets based on a scattered radiation; and
   correcting the auxiliary dataset during the iteration by applying the operator describing the image acquisition to the provisional 3D image dataset,
   wherein the operator $A_S$ describing the image acquisition is formed by:

$$A_S = -\ln[\exp(-R(f))+S(f)],$$

wherein:
   $R(f)$ is an operator for a forward projection from a 3D space on which the 3D image dataset is based to 2D planes on which the projected 2D image datasets are based, and
   $S(f)$ is not identical to zero and represents the scattered radiation.

2. The method as claimed in claim 1, wherein a first auxiliary dataset is formed from the 2D image datasets before the iteration.

3. The method as claimed in claim 1, wherein the auxiliary dataset is corrected based on a difference between data of the 2D image datasets and data acquired by applying the operator describing the image acquisition to the provisional 3D image dataset.

4. The method as claimed in claim 1, wherein the auxiliary dataset $\phi$ is iteratively calculated by:

$$\phi^{(i+1)}=\phi^{(i)}+\lambda^{(i)}(g-A_S f^{(i)}),$$

wherein:
   g represents the 2D image datasets,
   $A_S$ is the operator describing the image acquisition,
   $f^{(i)}$ is the provisional 3D image dataset, and
   $\lambda^{(i)}$ is a prefactor.

5. The method as claimed in claim 4, wherein the prefactor ($\lambda^{(i)}$) is different at least for two different iterations.

6. The method as claimed in claim 1, wherein the iteration is performed until a difference between data from the 2D image datasets and data acquired by applying the operator describing the image acquisition to the provisional 3D image dataset is smaller than a limit value.

7. The method as claimed in claim 1, wherein the iteration is performed until a difference between an operator describing the image acquisition applied to the provisional image dataset in the iteration and an operator describing the image acquisition applied to the provisional 3D image dataset in a previous iteration is smaller than a limit value.

8. The method as claimed in claim 1, wherein the iterations is terminated after a predetermined maximum number of iterations.

* * * * *